United States Patent [19]

Yamamoto

[11] Patent Number: 5,405,535
[45] Date of Patent: Apr. 11, 1995

[54] METHOD OF REMOVING METAL IMPURITY

[75] Inventor: Kenichi Yamamoto, both of Tokyo, Japan

[73] Assignee: NEC Corporation, Tokyo, Japan

[21] Appl. No.: 302,008

[22] Filed: Sep. 9, 1994

[30] Foreign Application Priority Data

Sep. 17, 1993 [JP] Japan .................. 5-230699

[51] Int. Cl.$^6$ ............................................. B01D 15/02
[52] U.S. Cl. ..................................... 210/669; 210/688; 210/663; 423/488
[58] Field of Search ............... 210/681, 688, 663, 668, 210/669, 749, 750; 423/484, 488

[56] References Cited

U.S. PATENT DOCUMENTS

| | | | |
|---|---|---|---|
| 4,125,594 | 11/1978 | Su et al. | 423/488 |
| 4,172,879 | 10/1979 | Miller et al. | 423/112 |
| 4,936,955 | 6/1990 | Dobson et al. | 423/488 |
| 4,952,386 | 8/1990 | Davison et al. | 423/484 |
| 5,164,093 | 11/1992 | Chilton et al. | 210/688 |
| 5,348,722 | 9/1994 | Shimono et al. | 423/488 |

FOREIGN PATENT DOCUMENTS

3-102827 4/1991 Japan .
4-286328 10/1992 Japan .

*Primary Examiner*—Cynthia L. Nessler
*Attorney, Agent, or Firm*—Popham, Haik, Schnobrich & Kaufman, Ltd.

[57] ABSTRACT

A method of removing a metal impurity, including the steps of: removing oxygen dissolved in a hydrofluoric-acid-containing chemical solution; and in order to remove a metal impurity contained in the hydrofluoric-acid-containing chemical solution free from the dissolved oxygen, bringing or circulating the hydrofluoric-acid-containing chemical solution into contact with or in a column filled with silicon granules to adsorb the metal impurity on the silicon granules.

4 Claims, 6 Drawing Sheets

METHOD OF REMOVING METAL IMPURITY

BACKGROUND OF THE INVENTION

1. Field of the Invention

The present invention relates to a method of removing a metal impurity contained in a hydrofluoric-acid-containing chemical solution used in the steps in manufacturing a semiconductor device.

2. Description of Related Arts

With an increase in integration density of a VLSI, demand for cleaning a silicon wafer surface becomes severer. As contaminants on the silicon wafer surface, fine particles, a metal, an organic material, an oxide film, and the like are known.

An oxide film is removed by etching using a hydrofluoric-acid-containing solution. However, although the oxide film can be removed by this process, when a metal impurity (copper, gold, or the like) is contained in the hydrofluoric-acid-containing chemical solution, this metal impurity is attached to a wafer to adversely affect the electrical characteristics of the wafer. For this reason, the hydrofluoric-acid-containing solution in which a metal impurity is accumulated by dipping wafers in the hydrofluoric-acid-containing solution must be regenerated and used by purifying the hydrofluoric-acid-containing solution, or the hydrofluoric-acid-containing solution must be replaced with a new one.

As a conventional method of removing a metal impurity, a distillation method, an ion-exchange resin method, and a silicon granule adsorption method (Japanese Patent Laid-Open Nos. 3-102827 and 4-286328) are used.

The distillation method is not suitably applied to purification of a solution mixture such as a hydrofluoricacid-containing chemical solution because the composition ratio of the solution changes after distillation. An ion-exchange resin method can be suitably applied to only a diluted hydrofluoric acid solution, and cannot be suitably applied to a chemical solution which contains high-concentration hydrofluoric acid or ammonium fluoride.

A method of removing a metal impurity contained in a hydrofluoric-acid-containing chemical solution performed by a silicon granule adsorption method is as follows. That is, the hydrofluoric-acid-containing chemical solution is brought into contact with silicon granules, the metal impurity in the hydrofluoric-acid-containing chemical solution is removed by adsorbing the metal impurity on the silicon granules.

In removing the metal impurity contained in the hydrofluoric-acid-containing chemical solution using the above conventional silicon granule adsorption method, when this method is used for a long time, the metal impurity adsorbed on silicon granule surfaces is oxidized by oxygen dissolved in the hydrofluoric-acid-containing chemical solution, and the metal impurity is disadvantageously dissolved in the hydrofluoric-acid-containing chemical solution again.

SUMMARY OF THE INVENTION

The present invention has been made to solve the above problems in the prior art, and has as its object to provide a method of stably removing a metal impurity contained in a hydrofluoric-acid-containing chemical solution for a long time to an extent corresponding to a purity which makes it possible to perform the steps in manufacturing a semiconductor device.

In order to achieve the above object, according to the first aspect of the present invention, there is provided a method of removing a metal impurity, comprising the steps of removing oxygen dissolved in a hydrofluoric-acid-containing chemical solution, and, in order to remove a metal impurity contained in the hydrofluoric-acid-containing chemical solution free from the dissolved oxygen, bringing the hydrofluoric-acid-containing chemical solution into contact with silicon granules to adsorb the metal impurity on the silicon granules.

According to the second aspect of the present invention, there is provided a method of removing a metal impurity, comprising the steps of removing oxygen dissolved in a hydrofluoric-acid-containing chemical solution, and, in order to remove a metal impurity contained in the hydrofluoric-acid-containing chemical solution free from the dissolved oxygen, circulating the hydrofluoric-acid-containing chemical solution in a column filled with silicon granules to adsorb the metal impurity on the silicon granules.

According to the third aspect of the present invention, there is provided a method of removing a metal impurity wherein the silicon granules according to the first and second aspects are metal-precipitated silicon granules each having a silicon Granule surface on which a metal is precipitated.

According to the present invention, since the dissolved oxygen contained in a hydrofluoric-acid-containing chemical solution is removed, the metal impurity adsorbed on the silicon granule surfaces can be prevented from being dissolved in the hydrofluoric-acid-containing chemical solution again.

When metal-precipitated silicon granules each having the silicon granule surface on which the metal is precipitated are used as silicon granules to improve metal impurity adsorption performance, the adsorbed metal impurity is prevented by the same effect as described above from being dissolved in the hydrofluoric-acid-containing chemical solution again.

Therefore, the metal impurity in the hydrofluoric-acid-containing chemical solution can be stably removed (concentration level of 0.01 ppb or less) for a long time.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENTS

The present invention will be described below on the basis of several preferred embodiments. According to the embodiments, a diluted hydrofluoric acid solution is used as a hydrofluoric-acid-containing chemical solution, copper is used as a metal impurity, and gold-precipitated silicon granules each having a silicon granule surface on which gold is precipitated are used as silicon granules.

Figure 1:
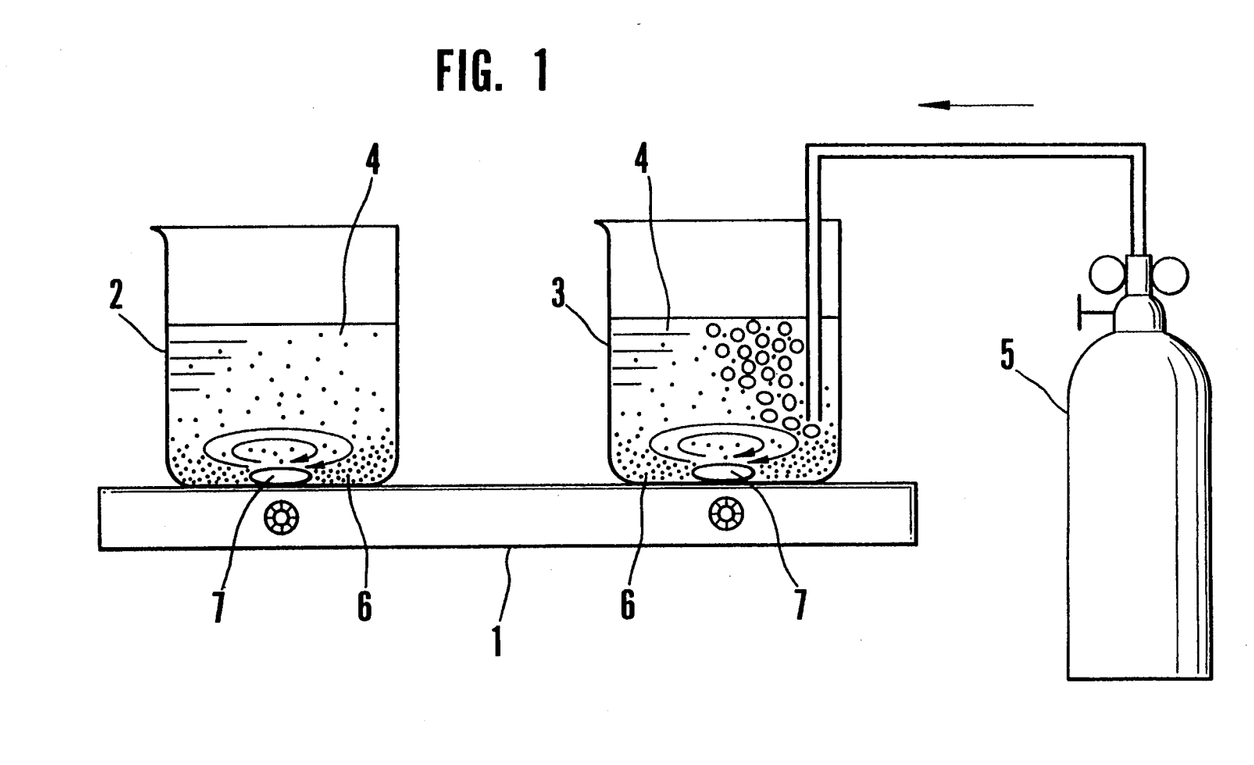
FIG. 1 is a sectional view showing an apparatus for explaining Example 1 of the present invention and a comparative example thereof.

FIG. 1 is a sectional view showing an apparatus for explaining Example 1 of the present invention and a comparative example thereof.

A copper-containing (1 ppm) 5% diluted hydrofluoric acid solution 4 (100 ml) was poured into each of reaction vessels 2 and 3 placed on a magnetic stirrer 1, and the reaction vessel 3 was defined as a reaction vessel used for explaining Example 1 of the present invention.

In the copper-containing (1 ppm) 5% diluted hydrofluoric acid solution in the reaction vessel 3, nitrogen bubbling was performed by a nitrogen bomb 5 to remove dissolved oxygen from the solution. In the copper-containing (1 ppm) 5% diluted hydrofluoric acid solution in the reaction vessel 2, nitrogen bubbling was not performed to compare this comparative example with Example 1. Gold-precipitated silicon granules 6 (10 g) were added in each of the solutions in the reaction vessels 2 and 3, and these solutions were stirred by stirrers 7.

Figure 2:
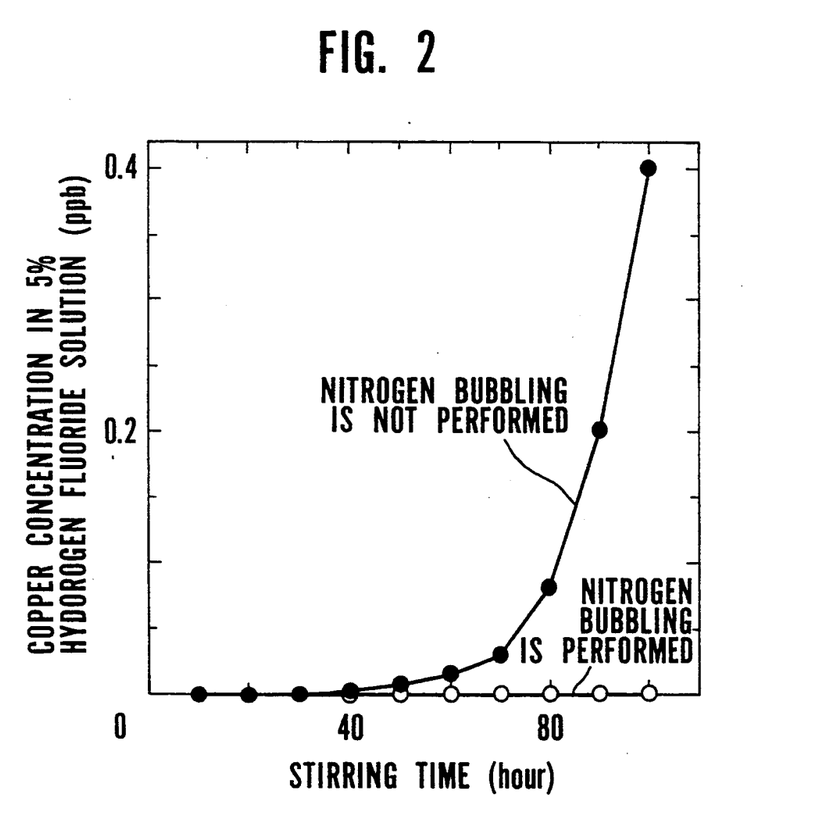
FIG. 2 is a graph showing a change in copper concentration in a hydrofluoric acid solution as a function of time in Example 1.

FIG. 2 shows changes in copper concentration in the hydrofluoric acid solutions with respect to a stirring time. As is apparent from FIG. 2, it was found that, when oxygen dissolved in the hydrofluoric acid solution was removed, copper could be stably adsorbed and removed for a long time until the copper concentration became 0.01 ppb or less. On the other hand, it was found that, when nitrogen bubbling was not performed, copper temporarily adsorbed on the gold-precipitated silicon granules 6 was dissolved in the hydrofluoric acid solution again so as to increase the copper concentration.

Figure 3:
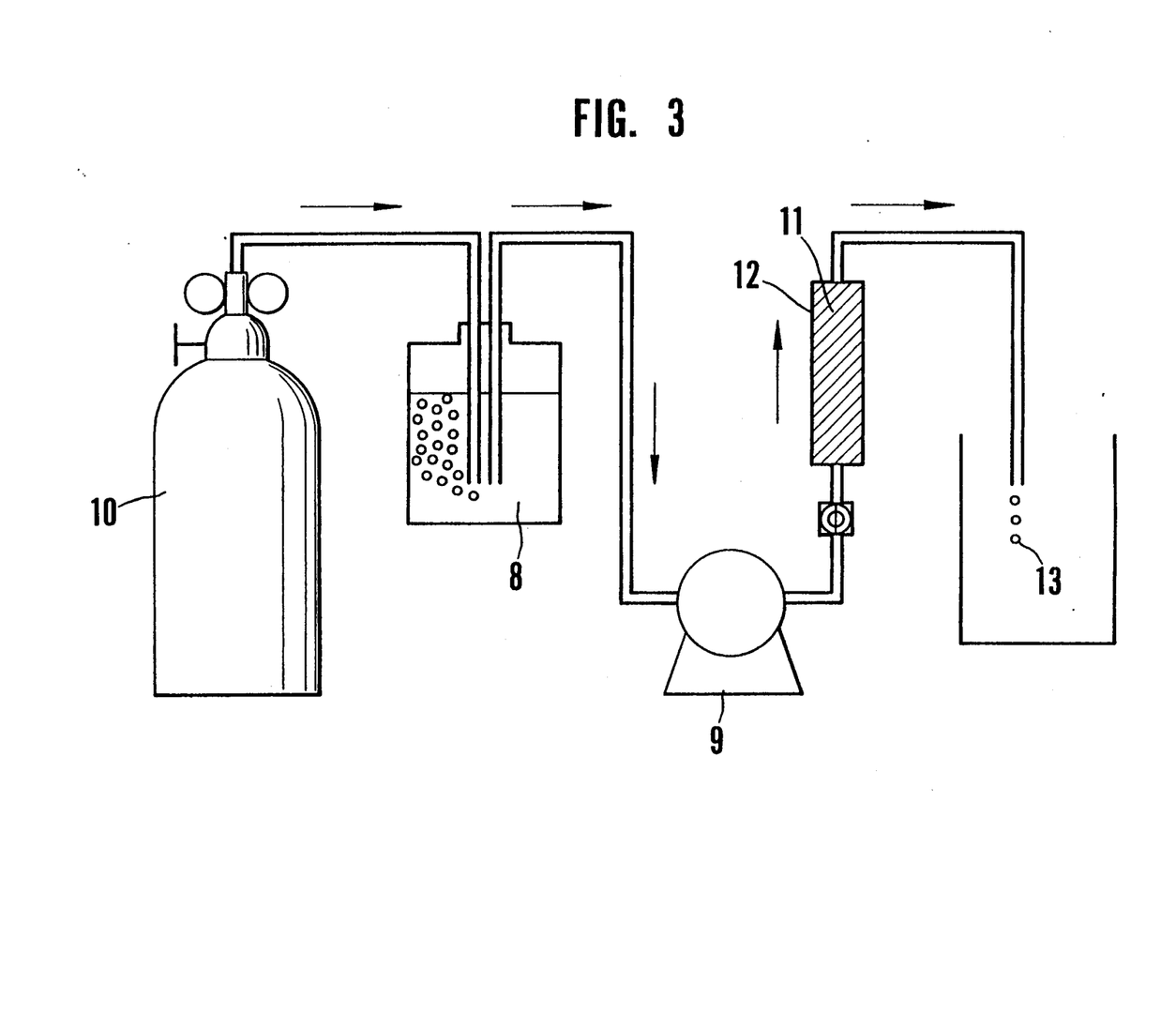
FIG. 3 is a sectional view showing an apparatus for explaining Example 2 of the present invention.

FIG. 3 is a sectional view showing an apparatus used in Example 2 of the present invention. This apparatus is constituted by a solution tank in which a copper-containing (1 ppm) 5% diluted hydrofluoric acid solution 8 is poured, a pump 9, a nitrogen bomb 10, and a column 12 filled with gold-precipitated silicon granules 11 (20 g). Nitrogen bubbling was performed in the copper-containing (1 ppm) 5% diluted hydrofluoric acid solution 8 by the nitrogen bomb 10 to remove the dissolved oxygen from the solution, and the solution was caused to pass through the column 12 at a flow rate of 12 ml/min so as to adsorb and remove copper from the solution by the gold-precipitated silicon granules 11.

Figure 4:
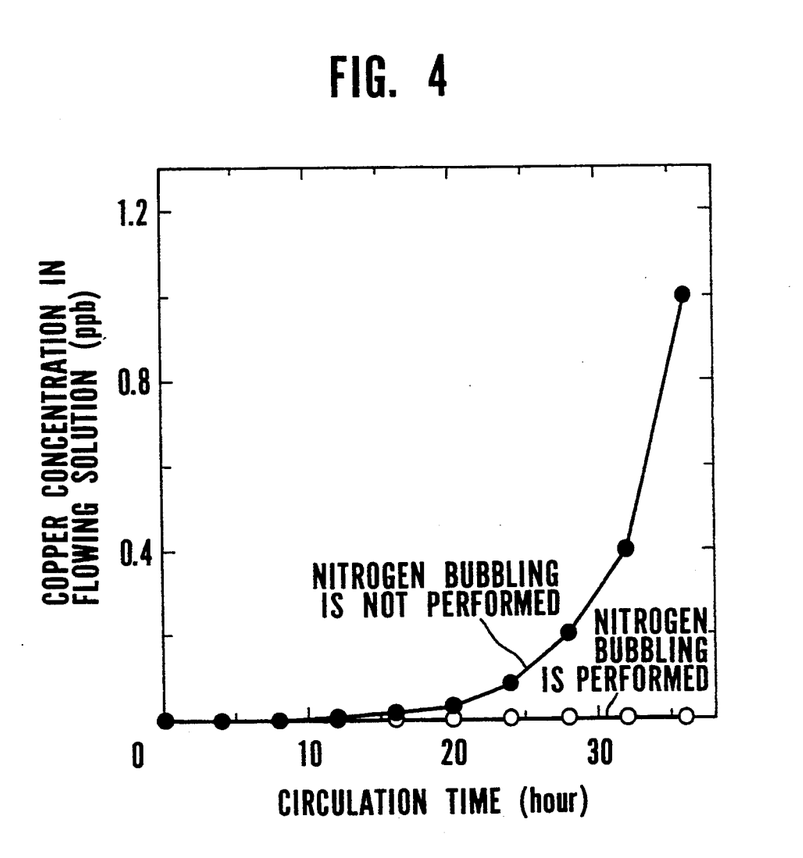
FIG. 4 is a graph showing a change in copper concentration in a solution from a column as a function of a column circulation time in Example 2.

FIG. 4 shows a change in copper concentration in a solution 13 from the column 12 as a function of a column circulation time. In comparison, FIG. 4 also shows a result obtained when nitrogen bubbling is not performed. It was found that, when the nitrogen bubbling was not performed, the copper concentration in the solution from the column increased to elute copper adsorbed on the gold-precipitated silicon granules 11. On the other hand, and it was found that, when the nitrogen bubbling was performed, no copper was detected in the solution from the column, and copper could be stably adsorbed and removed for a long time until the copper concentration became a concentration of 0.01 pph or less.

Figure 5:
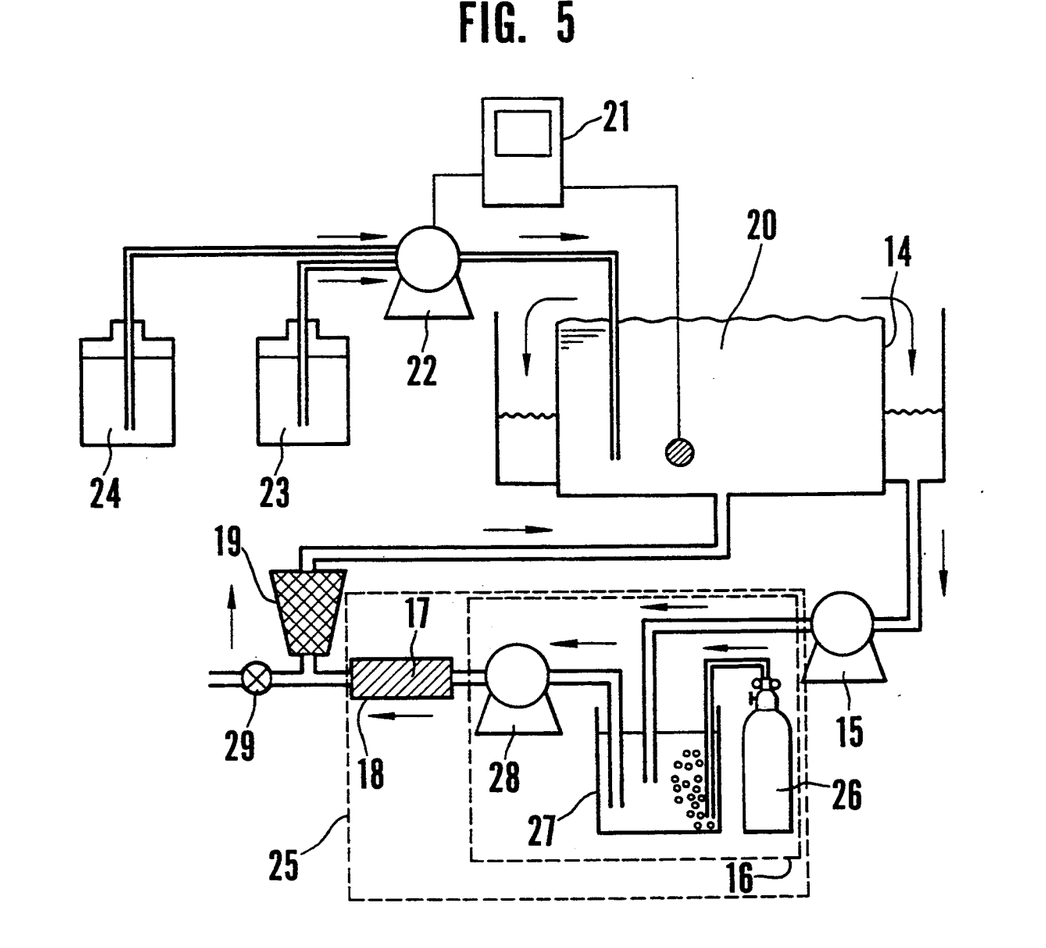
FIG. 5 is a sectional view showing an apparatus for explaining Example 3 of the present invention.

As Example 3, a case wherein a metal impurity removing apparatus is incorporated in an oxide film etching apparatus will be described below with reference to FIG. 5.

The oxide film etching apparatus incorporating with the metal impurity removing apparatus is constituted by a chemical tank 14 in which a 5% diluted hydrofluoric acid solution 20 is stored, a pump 15, a nitrogen bubbling apparatus 16, a column 18 filled with gold-precipitated silicon granules 17, and a filter 19 for removing fine particles from the hydrofluoric acid solution and silicon granules produced by the silicon-granule-filled column 18.

The nitrogen bubbling apparatus 16 is constituted by a nitrogen bomb 26, a bubbling tank 27, and a pump 28. Oxygen dissolved in the hydrofluoric acid solution 20 is removed from the hydrofluoric acid solution 20 by performing nitrogen bubbling.

The chemical tank 14 has a copper concentration monitor 21 and a pump 22 and receives a copper-containing (1,000 ppm) 5% diluted hydrofluoric acid solution 23 and a 5% diluted hydrofluoric acid solution 24 through the pump 22. While a copper concentration in the chemical tank 14 is monitored, the copper-containing (1,000 ppm) 5% diluted hydrofluoric acid solution 23 or the 5% diluted hydrofluoric acid solution 24 is added to the 5% diluted hydrofluoric acid solution 20 in the chemical tank 14. In this case, copper contamination having an arbitrary concentration can be experimentally simulated, and the copper concentration in the chemical tank 14 can be kept constant. Therefore, the performance of a metal impurity removing apparatus 25 according to the present invention can be evaluated and confirmed.

Figure 6:
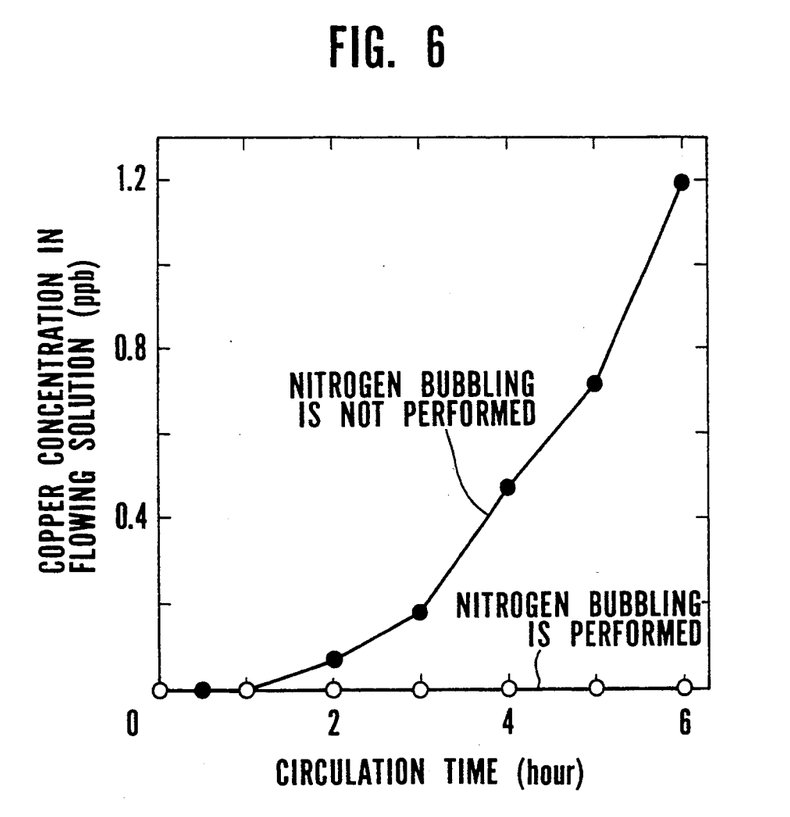
FIG. 6 is a graph showing a change in copper concentration in a solution from a column as a function of a column circulation time in Example 3.

According to the above method, the 5% diluted hydrofluoric acid solution 20 having a copper concentration adjusted to 1 ppm was supplied from the chemical tank 14 at a flow rate of 21 ml/min, and circulated through the bubbling tank 27, a column 18 filled with the gold-precipitated silicon granules 17 (400 g), the filter 19, and the chemical tank 14 in this order. A small amount of solution flowing from the column was extracted from a valve 29, and the copper concentration of this solution was quantitatively analyzed. FIG. 6 shows a change in copper concentration in the solution from the column as a function of a circulation time. In comparison, FIG. 6 also shows a result obtained when nitrogen bubbling is not performed. It was found that, when the nitrogen bubbling was not performed, the copper concentration in the solution from the column increased, and copper was eluted from the column.

It was found that, when nitrogen bubbling was performed, no copper was detected, and copper could be stably adsorbed and removed until the copper concentration became a concentration of 0.01 ppb or less.

As a method of removing dissolved oxygen, in addition to the nitrogen bubbling, a method such as a vacuum deaeration method, a film deaeration method, or a reduction method using a catalytic resin is known. The same effect as the effect of suppressing elution of a metal impurity adsorbed on silicon granules when nitrogen bubbling is performed can be expected.

In addition, when the metal impurity removing apparatus used in the present invention is used to be connected to a chemical circulation line for washing a silicon wafer or etching an oxide film, a hydrofluoric-acid-containing chemical solution can be circulated and regenerated, and the service life-of the chemical solution can be considerably prolonged.

Note that in Examples 2 and 3, although gold is used as a metal precipitated on silicon granule surfaces such that a metal impurity in a hydrofluoric-acid-containing chemical solution is highly efficiently adsorbed and removed, a metal which is rarely oxidized may be used in place of gold.

What we claim is:

1. A method of removing a metal impurity from a hydrofluoric-acid-containing chemical solution, comprising the steps of: removing oxygen dissolved in the hydrofluoric-acid-containing chemical solution; and in order to remove a metal impurity contained in the hydrofluoric-acid-containing chemical solution free from the dissolved oxygen, bringing the hydrofluoric-acid-containing chemical solution into contact with silicon granules to adsorb the metal impurity on said silicon granules.

2. A method of removing a metal impurity from a hydrofluoric-acid-containing chemical solution, comprising the steps of: removing oxygen dissolved in the hydrofluoric-acid-containing chemical solution; and in order to remove a metal impurity contained in the hydrofluoric-acid-containing chemical solution free from the dissolved oxygen, circulating the hydrofluoric-acid-containing chemical solution in a column filled with silicon granules to adsorb the metal impurity on said silicon granules.

3. A method according to claim 1, wherein said silicon granules are metal-precipitated silicon granules each having a silicon granule surface on which a metal is precipitated.

4. A method according to claim 2, wherein said silicon granules are metal-precipitated silicon granules each having a silicon granule surface on which a metal is precipitated.

* * * * *

UNITED STATES PATENT AND TRADEMARK OFFICE
CERTIFICATE OF CORRECTION

PATENT NO. : 5,405,535
DATED : April 11, 1995
INVENTOR(S) : Kenichi YAMAMOTO et al.

It is certified that error appears in the above-identified patent and that said Letters Patent is hereby corrected as shown below:

At the title page, item [75] Inventor, after the first-named inventor, "Kenichi Yamamoto," insert the name of the second inventor, --Tsugio Shimono--.

Signed and Sealed this

Thirtieth Day of May, 1995

*Attest:*

BRUCE LEHMAN

*Attesting Officer*      *Commissioner of Patents and Trademarks*